Dec. 18, 1923.

W. O. WHITE

COMPASS DEVIATION CORRECTOR

Filed July 20, 1922

1,478,080

Inventor.
Wilfrid O. White
by Heard Smith & Tennant.

Attys

Patented Dec. 18, 1923.

1,478,080

UNITED STATES PATENT OFFICE.

WILFRID O. WHITE, OF WABAN, MASSACHUSETTS.

COMPASS-DEVIATION CORRECTOR.

Application filed July 20, 1922. Serial No. 576,272.

*To all whom it may concern:*

Be it known that I, WILFRID O. WHITE, a citizen of the United States, residing at Waban, county of Middlesex, State of Massachusetts, have invented an Improvement in Compass-Deviation Correctors, of which the following description, in connection with the accompanying drawing, is a specification, like characters on the drawing representing like parts.

This invention relates to a device for correcting the deviation of a magnetic compass and is particularly designed for use in the correction of the deviation of small compasses such as used in motor boats.

The object of the invention is to provide a deviation corrector which may be used by a person unfamiliar with magnetism or magnets or their effect upon the compass and which by following a simple set of instructions will enable any ordinary deviation to be corrected with substantial accuracy.

The object of the invention is further to provide a device of this character of simple construction and suitable to be placed in the hands of persons unfamiliar with the theory of compass deviation correction.

These and other objects and features of the invention will appear more fully from the accompanying description and drawings and will be particularly pointed out in the claims.

The drawings illustrate a simple and preferred form of construction embodying the invention.

Figure 1:
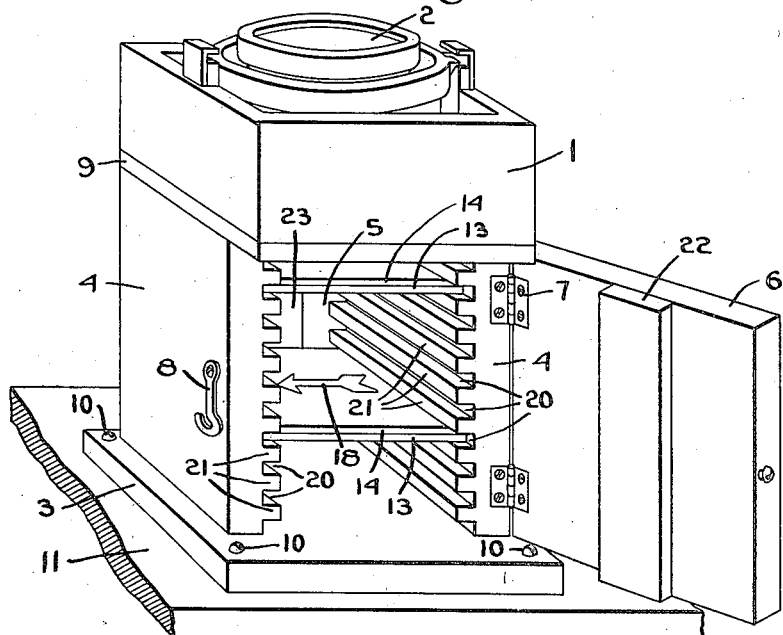
Fig. 1 is a view in perspective of a cabinet embodying a preferred form of the invention with a compass of ordinary form in place thereon.
Figure 4:
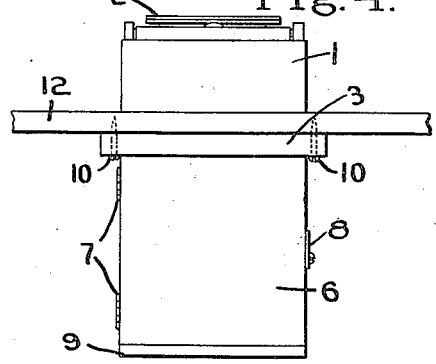
Fig. 4 is a front elevation of a construction such as shown in Fig. 1 with the cabinet inverted.

A compass of an ordinary type is shown in Figs. 1 and 4 comprising a square box 1 in which the compass proper 2 is suitably mounted on trunnions at right angles to each other so that the compass may maintain a level position. Magnetic compasses of this type are subject to deviation errors from various causes, such for example as masses of iron or magnetic material located in proximity to the compass on the boat or wherever the compass may be used.

It is necessary in such cases to correct the deviation in the compass in order that it may indicate accurately. This invention is provided for the purpose of correcting deviations known as the semicircular deviations of the compass as expressed by the coefficients B and C in the theory of compass adjustment. It is not designed to take care of any other extraordinary or unusual deviations. The correction provided by this invention will, however, except in most unusual cases be amply sufficient for compasses such as used in motor boats and small craft generally.

The invention provides a cabinet made of non-magnetic material preferably wood and preferably as shown of generally square form. As illustrated this cabinet comprises a square base 3 and a box-like structure secured to the base presenting the vertical side walls 4, the back wall 5 and a door 6 hinged to one of the side walls at 7 and provided with a suitable catch, herein shown in the form of a hook 8, by which the door may be locked in closed position. The end of the cabinet opposite the base 3 is preferably closed by a top plate 9.

This cabinet is permanently secured in place to the binnacle or mounting for the compass. In Fig. 1 the cabinet is shown attached by the screws 10 to the top surface of the binnacle or support 11 with the compass box, 1, placed on top of the cabinet in central alignment with the cabinet. That is, the vertical axis of the compass should align with the central vertical axis of the cabinet. If desired the cabinet may be inverted as shown in Fig. 4 and secured to the bottom of the support or binnacle shelf 12 and the compass 1 placed on top of the support 12 in similar central vertical alignment with the cabinet.

One of the main features of the invention resides in the plurality of magnetic plates employed to make the desired deviation correction. The plates for a given cabinet are all of similar size and shape so that any one may be placed in any one of the positions provided therefor in the cabinet.

Each plate in the preferred form shown comprises two layers 13 and 14 of nonmagnetic material and for this purpose preferably thin layers of wood are employed. These layers are secured together in any suitable manner. The plates thus made up of the two layers of non-magnetic material must be of quadrilaterally symmetrical shape or in other words symmetrical with respect to the axes 15—15 and 16—16 extending at right angles through the center of the plate. This desired shape is best secured by making the plates square, as shown.

Between the plates and preferably embodied in grooves therein and thus concealed from view, are the magnetic elements which are preferably in the form of small bar magnets 17. These bar magnets are arranged parallel to one of the axes of the plate or as shown parallel to the axes 16—16 and symmetrically balanced or positioned with respect to both of the axes. This is effected in the construction shown by providing the same number of bar magnets 17 at each side of the axes 16—16 and the same length of each of the magnets extending at each side of the axes 15—15. The poles of the magnets must also be similarly disposed and this is effected in the construction illustrated by having all the positive poles of the magnets point toward one edge of the plate as illustrated by the plus sign and all the negative poles point to the opposite edge as illustrated by the minus sign.

A suitable exterior indicium is provided on the face of the plate in prescribed relation to the poles of the magnets. Any suitable indicium may be employed and for that purpose there is indicated an arrow 18 painted or formed upon one face of the plate. The arrow is conveniently placed in alignment with the axes 15—15 so that the plus poles of the magnets are at the right of the arrow.

Figure 2:
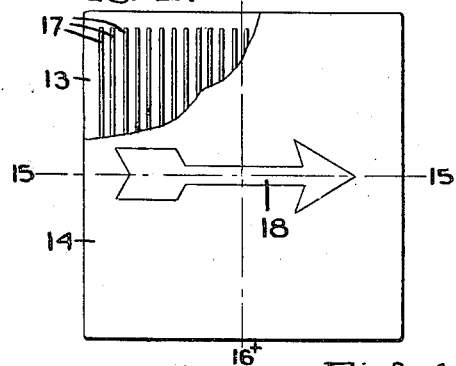
Fig. 2 is a plan view of a magnetic plate partially broken away and such as used in the preferred form of the invention.
Figure 3:
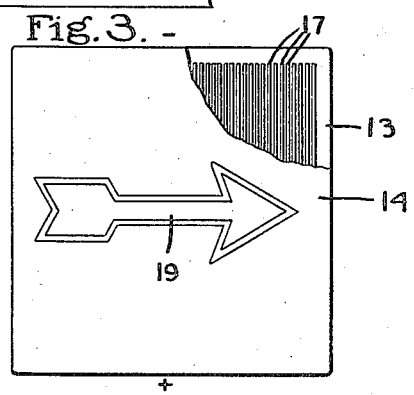
Fig. 3 is a view similar to Fig. 2 of another magnetic plate of more powerful magnetism.

It is desirable also to have plates of different magnetic power. In the construction illustrated the plate illustrated in Fig. 3 is provided with twice as many magnets as the plate illustrated in Fig. 2 and hence is of twice the magnetic power. A suitable indicium must be provided to indicate the magnetic power of the plate and for this purpose the arrow 19 on the plate of double power is illustrated of a different form from that on the plate in Fig. 2.

The cabinet is provided with means by which the magnetic plates may be vertically positioned therein in horizontal parallelism and in central alignment and with the poles of the plates pointing in either one of the four directions provided by the quadrilaterally symmetrical or square form of the plates. Thus it will be seen that any one of the plates may be placed in any one of four positions in the cabinet and at any desired vertical distance from the compass. A simple and efficient means for providing this positioning of the plates is secured by providing vertically spaced positioning ways on the sides 4 of the cabinet. These ways 20 are shown as formed between projections 21 on the side walls of the cabinet.

Means are also provided for retaining the plates in position in the cabinet so that they will be in correct central alignment. For this purpose a vertical cleat 22 is shown attached to the inside of the door 6 and a similar cleat 23 attached to the interior of the back wall of the cabinet. These are so arranged that when the door is closed the plates are held in proper position between the cleats.

A simple set of instructions providing the substance of the following description of the operation of the device is furnished the user of the compass and it will be seen that it is unnecessary for the user to be familiar in any way with the construction of the magnetic plates or with the theory of the correction of compass deviation. If the compass is to be used for example on a motor boat or small vessel the vessel is first to be placed on some known east or west course taken from a chart. If the compass is found not to point correctly then the user takes one of the magnetic plates and places it in the cabinet with the arrow pointing either to starboard or to port. The user shifts the plate into one or the other of the vertical positions provided and, if necessary, employs two or more plates of the same or different power until the compass is brought into agreement with the course. The vessel is then turned and put onto a north or south course and, if the compass is then found to deviate further, plates are put in position in the cabinet with the arrow pointing forward or aft until the compass is again brought to correct position in accordance with the course. The courses should then be reversed and checked up to see if all the four cardinal courses, north, east, south and west are correct. When the compass shows its greatest deviations on east and west courses the upper positions in the cabinet should be used to correct these courses and if the north and south courses show the greatest deviations the upper positions should be used to correct them. But plates already placed in place to correct one set of courses should not be changed to correct the other set of courses. That is to say, if for example two plates are in place to correct east and west courses these plates should not be moved to correct the north and south courses and vice versa. The plates may be mixed in the positions some with the arrow forward or aft and some with the arrow athwartship but when the correction has been finished the arrows should generally point in two directions only. The courses used for testing the compass must be within one point of the cardinal courses and the nearer the better. The compass must be placed so that the lubber line is fore and aft, and the box parallel with the keel.

As already pointed out the equipment of this invention is not designed to correct the quadrantal deviations but experience has shown that in small boats this deviation does not often exist and if it does is slight.

In making the deviation correction, care must be taken to keep away from any masses of iron or magnetic material and the vessel must be maintained during the correction on the proper course.

Having thus described my invention, what I claim as new and desire to secure by Letters Patent, is:

1. A compass deviation corrector comprising a cabinet to be mounted beneath and centrally of a compass, a plurality of similar flat quadrilaterally symmetrical plates provided with interior magnetic elements having like poles similarly disposed and with exterior indicia having a prescribed relation to the poles, and means for supporting the plates in the cabinet at various vertical positions, in horizontal parallelism, in central alignment and with the poles in either of the four directions.

2. A magnet plate for a compass deviation corrector comprising a flat quadrilaterally symmetrical base of non-magnetic material, a plurality of bar magnets located within and concealed by said base and arranged parallel to one of the axes and symmetrically positioned with respect to the axes of said base and with like poles of the magnets similarly disposed, there being an exterior indicium on said base disposed in prescribed relation to the poles of the magnets.

3. A magnet plate for a compass deviation corrector comprising a pair of quadrilaterally symmetrical connected layers of non-magnetic material, a plurality of bar magnets located between and concealed by said layers and arranged parallel to one of the axes and symmetrically positioned with respect to the axes of said layers and with like poles similarly disposed, there being an exterior indicium on said plate disposed in prescribed relation to the poles of the magnets.

In testimony whereof, I have signed my name to this specification.

WILFRID O. WHITE.